(12) United States Patent
Wessel

(10) Patent No.: US 9,147,406 B1
(45) Date of Patent: Sep. 29, 2015

(54) WRITE POLE WITH CORROSION BARRIERS

(71) Applicant: Seagate Technology LLC, Cupertino, CA (US)

(72) Inventor: James Gary Wessel, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/276,159

(22) Filed: May 13, 2014

(51) Int. Cl.
*G11B 5/31* (2006.01)

(52) U.S. Cl.
CPC ............. *G11B 5/31* (2013.01); *G11B 5/3106* (2013.01)

(58) Field of Classification Search
USPC ............ 360/122, 125.3, 125.71, 125.33, 360/125.34, 125.74, 125.75, 125.31, 125.32
See application file for complete search history.

(56) References Cited

U.S. PATENT DOCUMENTS

| | | | | |
|---|---|---|---|---|
| 5,488,528 | A | * | 1/1996 | Chen et al. ............... 360/125.35 |
| 6,381,095 | B1 | * | 4/2002 | Sin et al. .................. 360/125.43 |
| 6,404,601 | B1 | * | 6/2002 | Rottmayer et al. .......... 360/317 |
| 6,879,462 | B2 | * | 4/2005 | Otsuka ..................... 360/125.3 |
| 7,609,478 | B2 | | 10/2009 | Han et al. |
| 7,656,611 | B2 | | 2/2010 | Liu et al. |
| 8,289,650 | B2 | * | 10/2012 | Seigler et al. ............. 360/125.3 |
| 8,405,931 | B2 | | 3/2013 | Kief et al. |
| 8,670,211 | B1 | * | 3/2014 | Sun et al. ................ 360/125.01 |
| 2009/0021861 | A1 | * | 1/2009 | Vas'ko et al. ................ 360/122 |
| 2012/0230168 | A1 | * | 9/2012 | Izawa et al. ............... 369/13.32 |

* cited by examiner

*Primary Examiner* — Wayne Young
*Assistant Examiner* — Carlos E Garcia
(74) *Attorney, Agent, or Firm* — Hollingsworth Davis, LLC

(57) ABSTRACT

A write pole of a heat assisted magnetic recording (HAMR) write head includes a high moment magnetic material that extends from the write head toward an air barrier surface (ABS) of the write head. At least one stop layer is provided on or within the high moment magnetic material. The stop layer is situated at or near the ABS and is of a corrosion-resistant material.

14 Claims, 6 Drawing Sheets

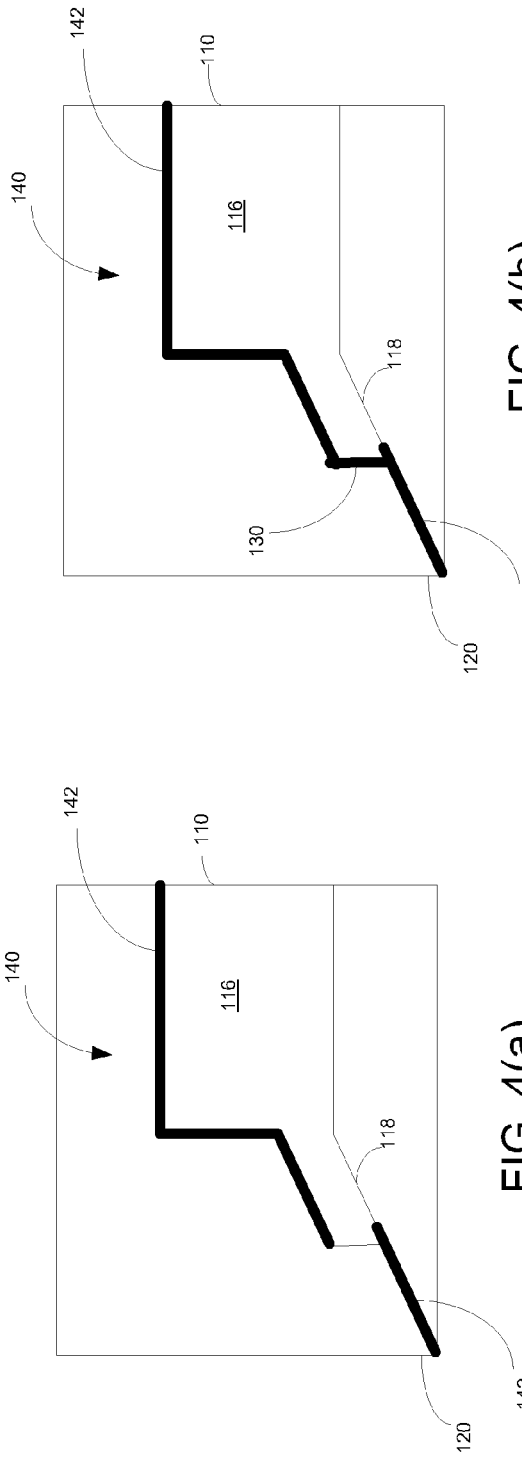
FIG. 4(a)
FIG. 4(b)
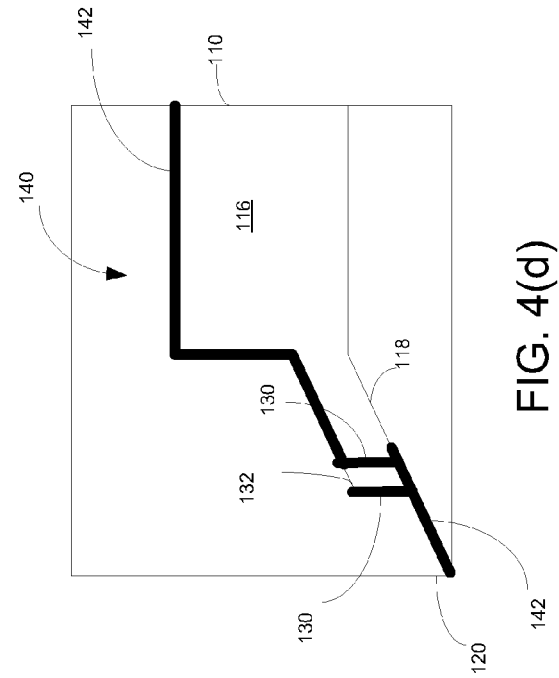
FIG. 4(c)
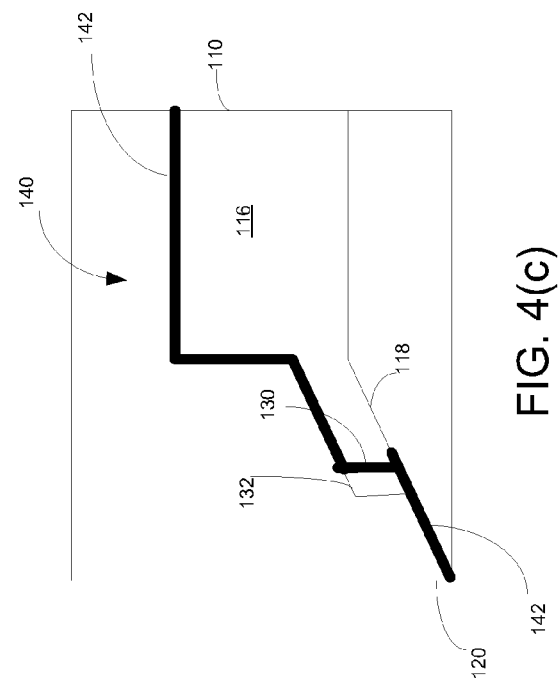
FIG. 4(d)

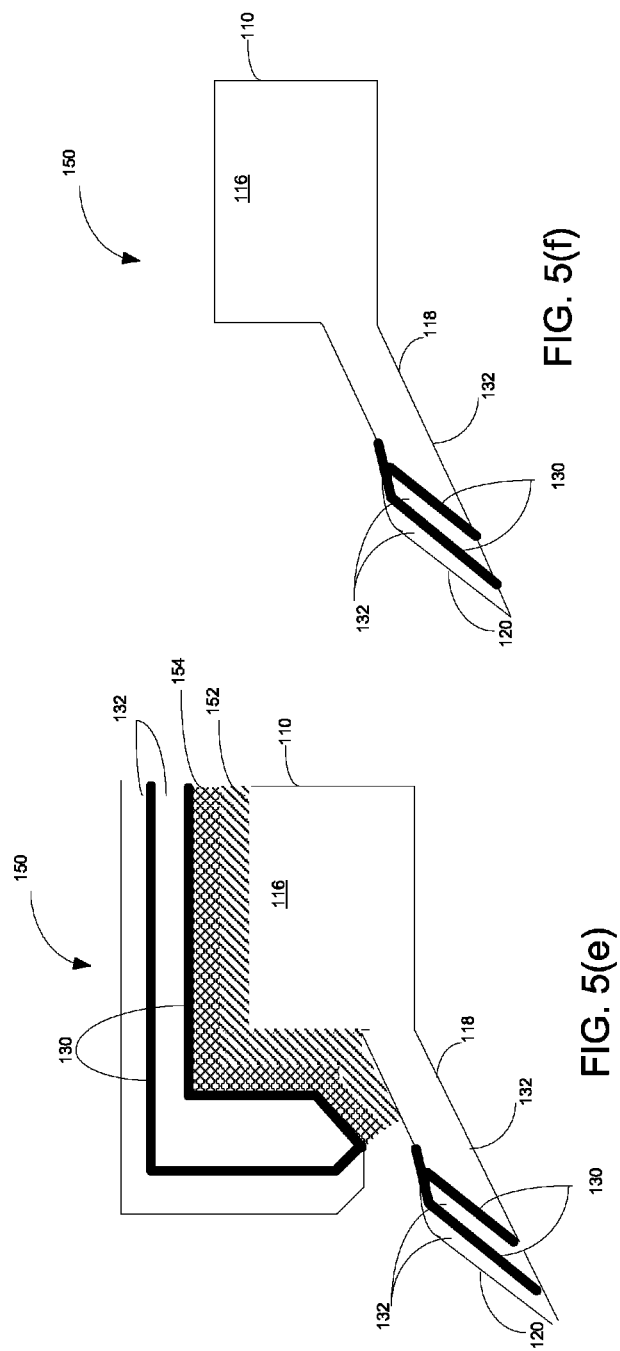
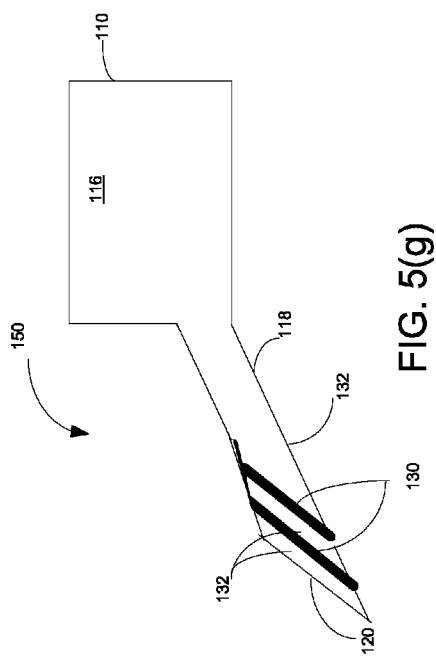
FIG. 5(e)
FIG. 5(f)
FIG. 5(g)

WRITE POLE WITH CORROSION BARRIERS

SUMMARY

A write pole of a heat assisted magnetic recording (HAMR) write head includes a high moment magnetic material that extends from the write head toward an air barrier surface (ABS) of the write head. At least one stop layer is provided on or within the high moment magnetic material. The stop layer is situated at or near the ABS and is of a corrosion-resistant material.

A write pole of a HAMR write head includes a high moment magnetic material that extends from the write head toward an air barrier surface (ABS) of the write head and further includes a tip proximate the air barrier surface. A cap covers the write pole tip is of a corrosion-resistant material.

A process for fabricating a HAMR write head includes fabricating a write pole. The process for fabricating the write pole includes establishing a first layer of a high moment magnetic material and establishing a second layer of a corrosion-resistant material intermediate the first layer of high moment magnetic material and an air barrier surface (ABS).

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 4(a)-4(f) illustrate an example embodiment of a process for fabricating an example embodiment of a write pole.

FIGS. 5(a)-5(g) illustrate an example embodiment of a process for fabricating an example embodiment of a write pole.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (HAMR) generally refers to the concept of locally heating a recording media to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information.

For heat assisted magnetic recording, an electromagnetic wave of, for example, visible, infrared, or ultraviolet light can be directed onto a surface of a data storage media to raise the temperature of a localized area to facilitate switching. Well known optical waveguides such as solid immersion lenses (SILs), solid immersion mirrors (SIMs), and mode index lenses have been proposed for use in reducing the size of a spot on the media that is subjected to the electromagnetic radiation. Due to diffraction limited optical effects, SILs, SIMs, and mode index lenses alone are not sufficient to achieve focal spot sizes necessary for high areal density recording. Metal pins and other near field transducer (NFT) designs are positioned at the focal point of the waveguide and used to further concentrate the energy and direct it to a small spot on the surface of the recording media.

Figure 1:
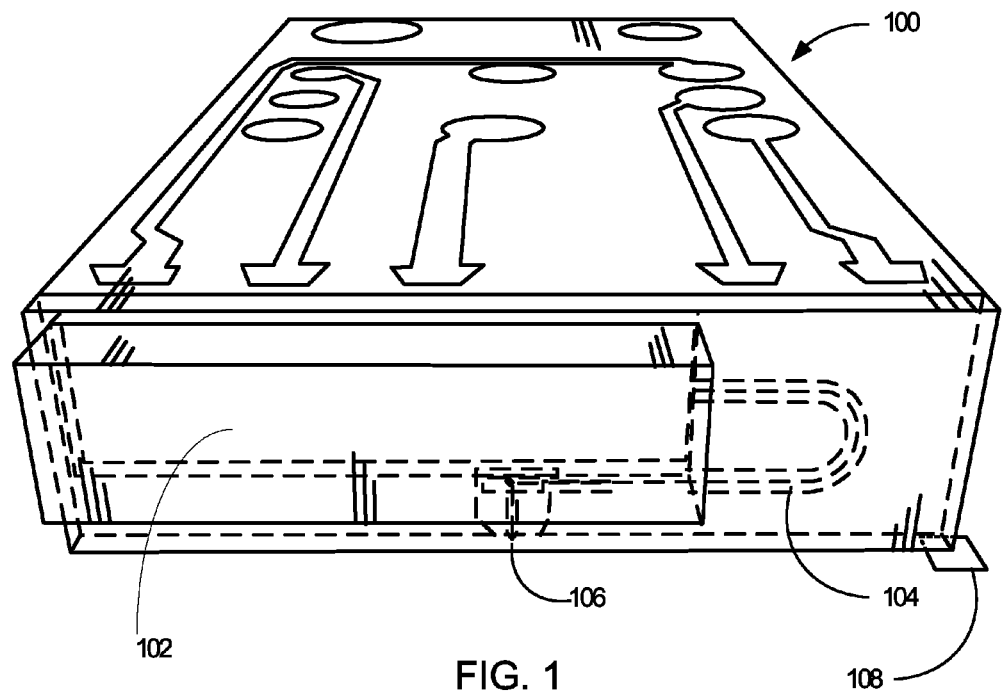
FIG. 1 is a perspective view of a hard drive slider including a write pole of an example embodiment.

An example of a HAMR slider is shown in FIG. 1, wherein the slider 100 includes a light source 102, e.g., laser diode, a waveguide 104, a write head 106 and an air bearing surface (ABS) 108. The light from the light source 102 is transmitted through the waveguide 104 to the write head 106 having a write pole (not shown) proximate the ABS 108.

Figure 2:
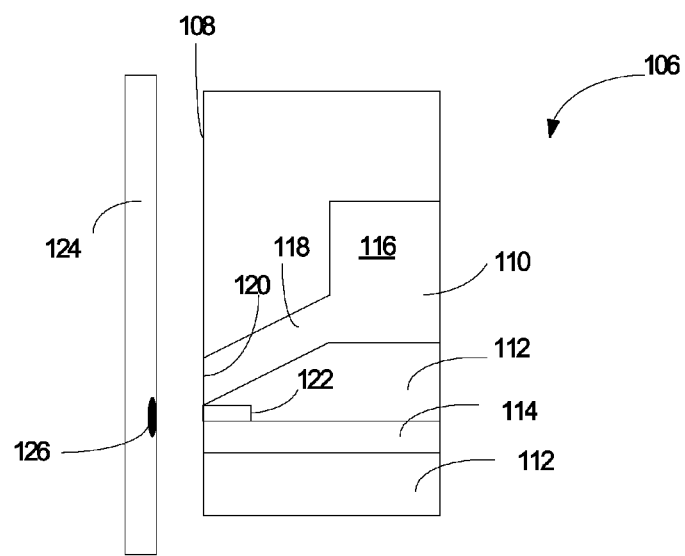
FIG. 2 is a cross-sectional view of a portion of a write head including a write pole of an example embodiment.

FIG. 2 provides a cross-sectional view of a portion of an exemplary write head 106 with a focus on the sloped configuration of the write pole 110. In this configuration, the write head 106 includes a waveguide core 114 with cladding 112 surrounding the waveguide core 114. The waveguide 104 consists of the combination of the top and bottom cladding layers 112 and the waveguide core 114 The write head 106 additionally includes the write pole 110 which is comprised of a main body portion 116 and a sloped portion 118 whose tip 120 is proximate the ABS 108. The write head 106 further includes a near field transducer (NFT) 122 positioned proximate the tip 120 of write pole 110. A magnetic medium 124 is also depicted in proximity with the write head 106. In operation, the waveguide 104 delivers electromagnetic energy to the NFT 122, which directs the energy to a small hot spot 126 on the medium 124. An electric current changes the magnetic flux at the tip 120 of the write pole 110 whereby the flux from the write pole changes a magnetic orientation of the hotspot 126.

While the use of HAMR technology has increased the amount of data and the speed at which data may be stored, various features of the technology can be addressed to further enhance operation. One item of note with respect to current HAMR technology is the occurrence of corrosion of the high moment write pole at the ABS in HAMR transducers. The root causes for corrosion are not fully understood but high temperature and acidic lubrication are possible likely accelerants. For example, the extreme heat can lead to erosion of the write head overcoat, e.g., diamond-like carbon (DLC) overcoat, which allows the overcoat to be more chemically permeable. With a chemically permeable overcoat and a highly acidic environment, corrosion of the write pole can occur. Other potential causes for write pole corrosion include galvanic stress and high electric fields.

One attempt to deal with the issue of write pole corrosion is recession, i.e., removal of high moment material, of the write pole from the ABS. However, experimentation with the recession concept has shown that the amount of recession can be highly variable resulting in excessive recession and, thereby, a reduction in the write field strength.

Figure 3:
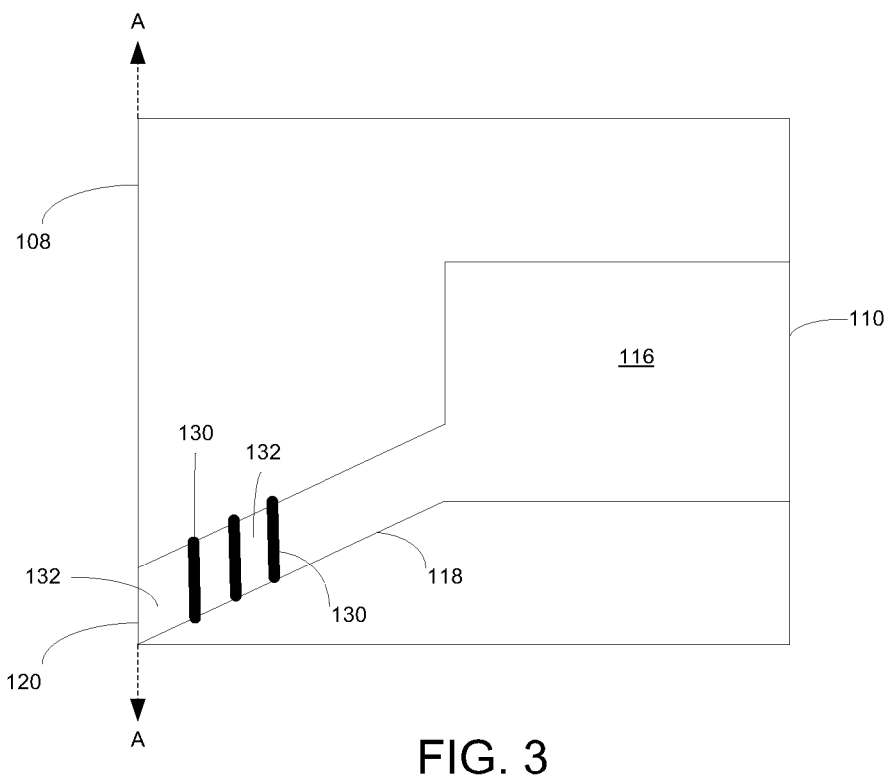
FIG. 3 is a close-up view of a write pole of an example embodiment.

The present disclosure presents various embodiments of a write pole, and a procedure for fabricating a write pole, that address the issues of write pole corrosion and write pole recession. With reference to FIG. 3, an example embodiment of a write pole 110 for use in a HAMR write head is depicted including one or more stop layers 130. The write pole 110 is of a high moment magnetic material 132, e.g., Fe65/Co35, while the stop layers 130 are of a corrosion-resistant material, e.g., NiP, Ni, or Ni80Fe20. The stop layers 130 are thin, e.g., 2-5 nm, while the layers of high moment magnetic material 132 between the stop layers 130 are in the 30-50 nm range. The shallow depth of the stop layers 130 minimizes the loss of magnetic field in the write pole 110. The stop layers are in a vertical orientation presenting as substantially parallel to the vertical axis A-A, which is defined by ABS 108, in FIG. 3.

The stop layers 130 act to limit the penetration depth of unintended corrosion and provide depth control for etch-based recession methods at the ABS 108. While one stop layer 130 is likely sufficient to stop corrosion, multiple stop layers 130 may be desired to ensure that at least one complete stop layer is established during fabrication. Due to variations in manufacturing, the stop layer 130 at a specific location may not be complete and/or a stop layer may be unintentionally removed; redundancy of stop layers 130 ensures that at least one stop layer 130 will survive the manufacturing process. The corrosion-resistant materials of the stop layers 130 do not appreciably affect the magnetic field generated by the write pole 110; however, the magnetic field of the write pole 110 is slightly affected in that the stop layers 130 are occupying space that would otherwise be filled with the high moment magnetic material 132. Compared to a non-corroded write pole formed of high moment material, the installation of either low-moment or non-magnetic corrosion barriers will result in some loss of magnetic field. The exact amount of field loss is highly dependent on details such as media design, write pole shape, coil current, head-media-spacing and NFT design. Herein is provided a rough, worst-case estimate of field loss using an effective moment approximation. In this approximation, the percentage of field loss is equal to the fractional, volume-average reduction in magnetic moment in the write pole near the ABS. As a numeric estimate of field loss, it is assumed that the corrosion barriers are non-magnetic, 3 nm thick, and spaced by 30 nm. The volume average moment of the ABS write pole is reduced by 10%, thus the effective moment approximation predicts a 10% loss of magnetic field.

Various wafer fabrication techniques can be used to produce the layered write pole structure of FIG. 3. In an example embodiment, electroplating methods can be used to produce alternating lamella of high magnetic moment material 132 and the corrosion-resistant material of the stop layers 130. FIGS. 4(a)-4(f) illustrate the layering process 140. Initially, an insulating and/or non-plating substrate 142, e.g. tantalum (Ta), is layered atop the write pole 110 and is provided beneath the tip 120 of the write pole 110, per FIG. 4(a). A stop layer 130 is then provided in a vertical orientation across the tip 120, per FIG. 4(b). Subsequently, a layer of high moment magnetic material 132 is provided across the tip 120 positioned forward of the stop layer 130, per FIG. 4(c). A next stop layer 130 is provided across the tip 120 positioned forward of the high magnetic moment material 132, per FIG. 4(d). This sequence of alternating stop layers 130 and high magnetic moment material 132 may be repeated as desired, per FIG. 4(e). It should be noted that in this configuration that the write pole tip 120 and the alternating layers 130 and 132 are presented in a vertical orientation, however, an angled, non-vertical orientation may also be used. Finally, any excess material is removed from the write pole tip 120 at the ABS, per FIG. 4(f).

In another example embodiment, the write pole structure of FIG. 3 is fabricated under a non-plated processing option. FIGS. 5(a)-5(g) illustrate the layering process 150. Initially, the write pole 110 is topped with a photoresist release layer 152 and a photoresist layer 154, per FIG. 5(a). Subsequently, an ABS portion of the write pole tip 120 is removed by etching presenting the tip 120 in sloped orientation to enable easier subsequent layer depositions, per FIG. 5(b). Sputtering, or other appropriate technique, is then used to deposit a first stop layer 130 across the sloped write pole tip 120 per FIG. 5(c). Sputtering, or other appropriate technique, is subsequently used to establish a first high magnetic moment material 132 layer forward of the stop layer 130, per FIG. 5(d). The previous two steps may be repeated to obtain the desired number of alternating layers 130 and 132, per FIG. 5(e). Subsequently, the photoresist layers are removed, per FIG. 5(f) and any excess material is removed from the write pole tip 120 at the ABS, per FIG. 5(g).

Figure 6:
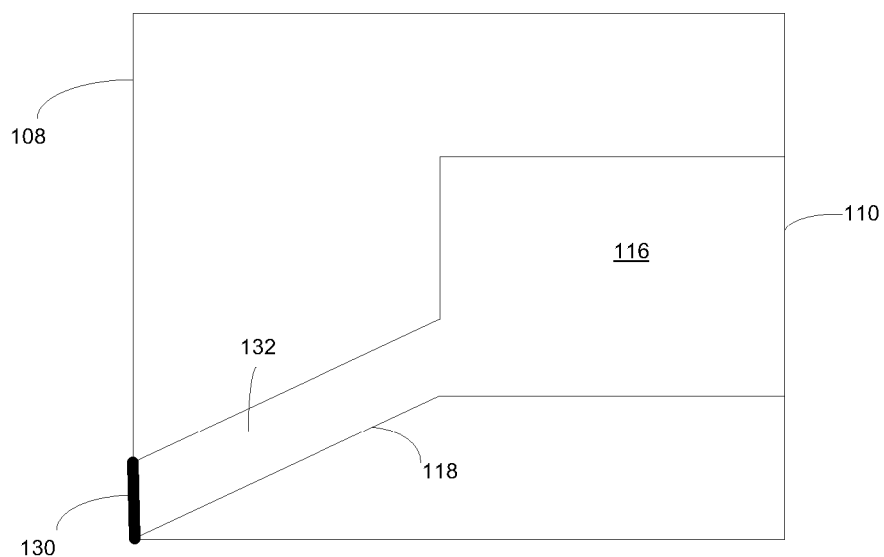
FIG. 6 is a close-up view of a write pole of an example embodiment.
Figure 4F:
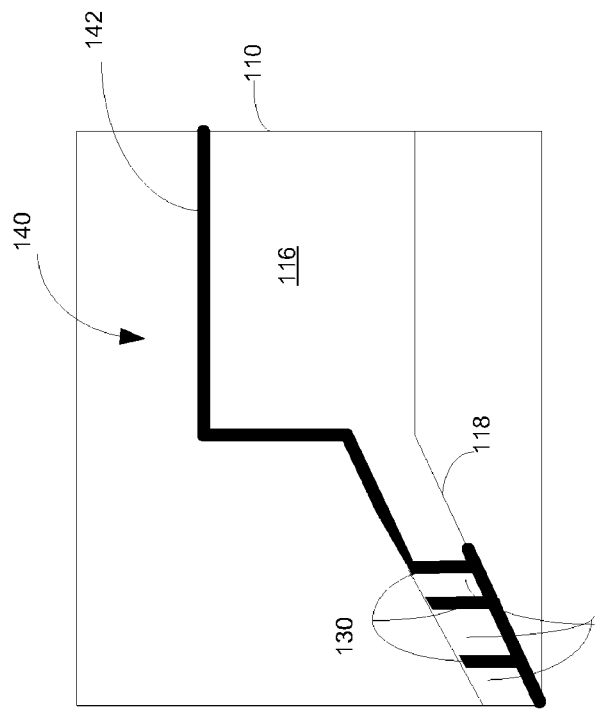
Figure 4E:
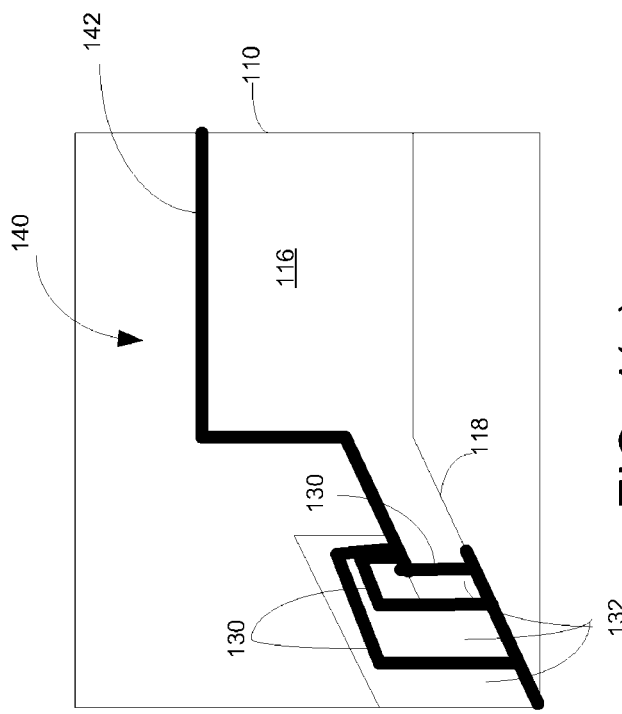
Figure 5A:
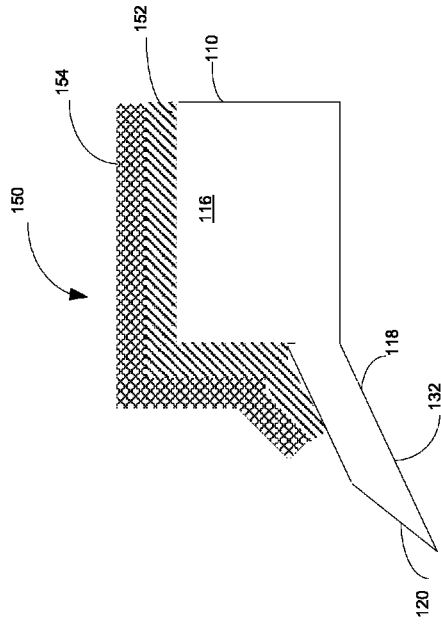
Figure 5B:
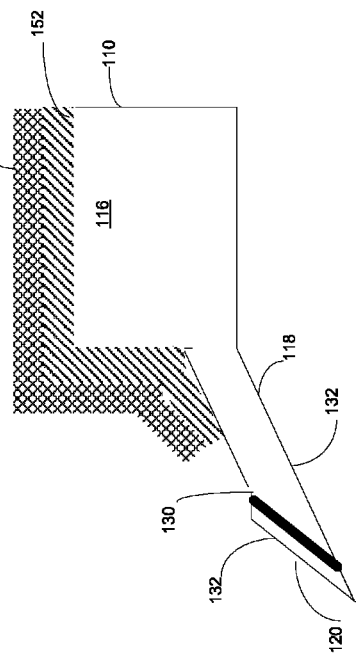
Figure 5C:
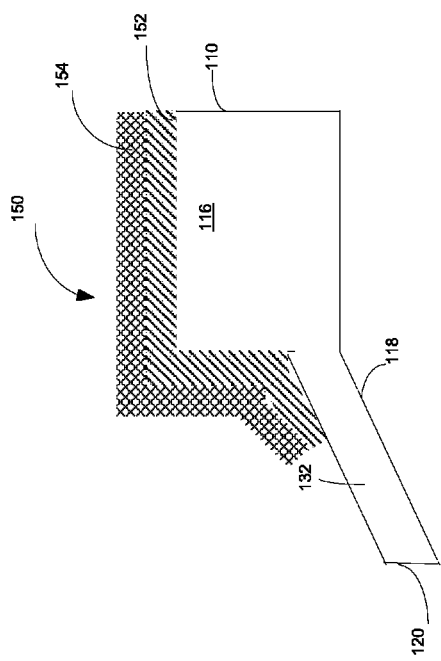
Figure 5D:
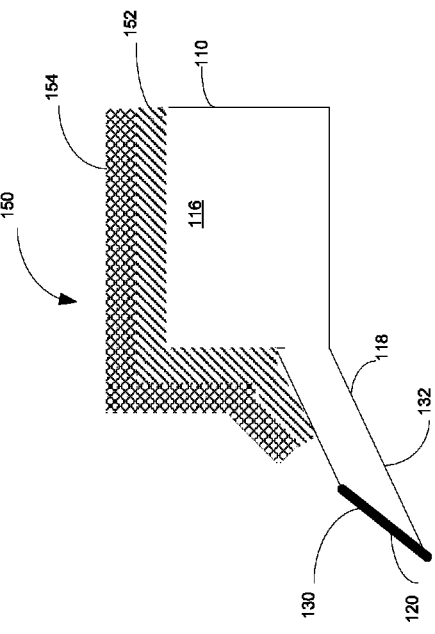

In another example embodiment, see FIG. 6, the write pole 110 is provided with a single stop layer 130 in a cap configuration provided at the tip 120 of the write pole 110. In this cap configuration, the high magnetic moment material 132 at the tip 120 of the write pole 110 has been etched away during fabrication to present a void that can be back-filled with the corrosion-resistant material of the stop layer 130. This stop layer 130 once again has a thickness in the range of 2-5 nm. The cap configuration of the stop layer 130, presenting at the ABS 108, creates an up-front protective barrier at the surface tip 120 of the write pole 110. Alternatively, the write pole 110 may incorporate the combination of stop layers 130 from FIG. 3 and the cap configuration of stop layer 130 from FIG. 6.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:
1. An apparatus, comprising:
a write pole of a heat assisted magnetic recording (HAMR) write head, the write pole comprising a high moment magnetic material and extending from the write head toward an air barrier surface (ABS) of the write head; and at least one stop layer within the high moment magnetic material and situated near the ABS the at least one stop layer comprising a corrosion-resistant material and having a longitudinal axis that is substantially parallel to a longitudinal axis of the ABS or that is transverse to a longitudinal axis of the write pole.

2. The apparatus of claim 1, wherein the at least one stop layer has a thickness substantially in the range of about 2-5 nm.

3. The apparatus of claim 1, wherein the at least one stop layer comprises a plurality of stop layers.

4. The apparatus of claim 3, wherein a layer of the high moment magnetic material is disposed between adjacent stop layers.

5. The apparatus of claim 4, wherein the layer of high moment magnetic material has a thickness substantially in the range of 30-50 nm.

6. The apparatus of claim 4, wherein each stop layer and each layer of high moment magnetic material is fabricated with electroplating or sputtering.

7. An apparatus comprising:
a write pole of a heat assisted magnetic recording (HAMR) write head, the write pole comprising a high moment magnetic material and extending from the write head toward an air barrier surface (ABS) of the write head, the write pole having a tip proximate the air barrier surface; and
a cap covering the write pole tip, the cap comprising a corrosion-resistant material, wherein the cap has a longitudinal axis that is substantially parallel to a longitudinal axis of the ABS or that is transverse to a longitudinal axis of the write pole; and
a plurality of stop layers within the high moment magnetic material of the write pole.

8. The apparatus of claim 7, wherein the cap has a thickness substantially in the range of 2-5 nm.

9. The apparatus of claim 7, wherein the plurality of stop layers each of a thickness substantially in the range of 2-5 nm and wherein the plurality of stop layers are separated by a layer of high moment magnetic material having a thickness substantially in the range of 30-50 nm.

10. A process, comprising:
fabricating a write pole of a heat assisted magnetic recording (HAMR) write head, comprising:
forming a first layer of a high moment magnetic material; and
forming a second layer of a corrosion-resistant material within the first layer of the high moment material and an air barrier surface (ABS), wherein the second layer has a longitudinal axis that is substantially parallel to a longitudinal axis of the ABS or that is transverse to a longitudinal axis of the write pole.

11. The process of claim 10, further comprising forming a plurality of second layers of corrosion-resistant material.

12. The process of claim 11, further comprising forming additional first layers of high moment magnetic material to separate the plurality of second layers of corrosion-resistant material.

13. The process of claim 12, wherein each of the plurality of second layers of corrosion-resistant material has a thickness substantially in the range of 2-5 nm and wherein the additional first layers of high moment magnetic material each have a thickness substantially in the range of 30-50 nm.

14. The process of claim 11, wherein forming the first layer of high moment magnetic material comprises forming a vertical first layer or forming an angled first layer.

* * * * *